Feb. 21, 1967   JEAN-FÉLIX PAULSEN   3,304,743
ELASTIC COUPLINGS
Filed Nov. 2, 1964   4 Sheets-Sheet 1

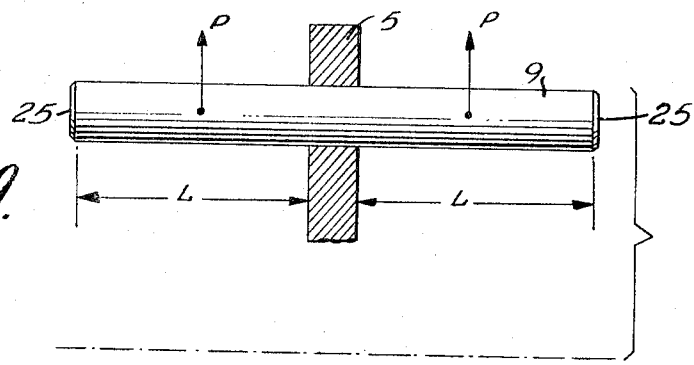
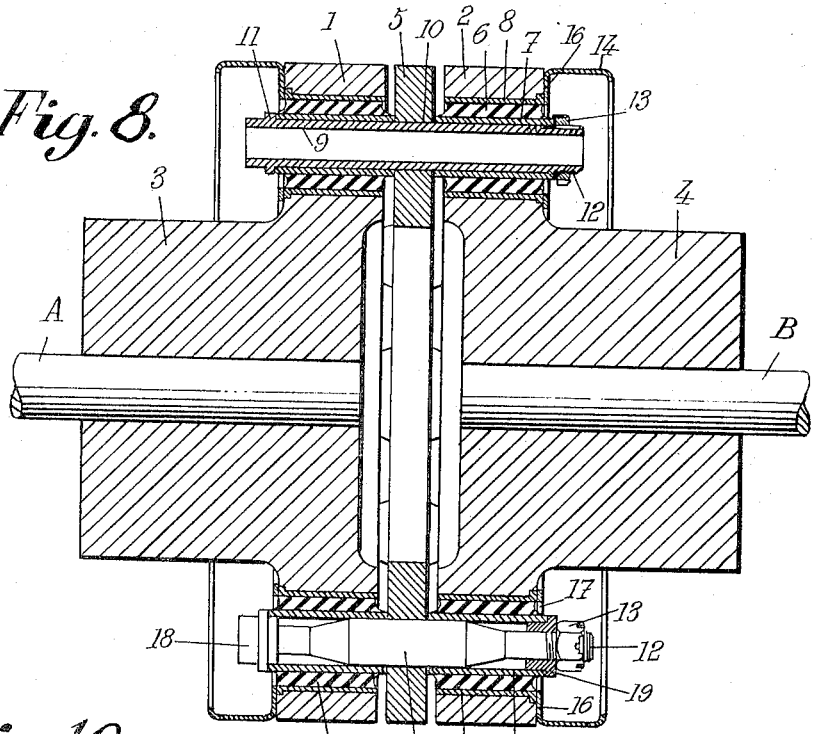
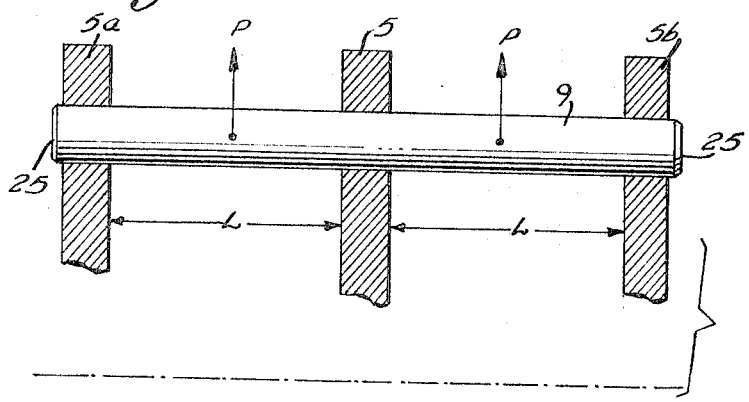

United States Patent Office 3,304,743
Patented Feb. 21, 1967

3,304,743
ELASTIC COUPLINGS
Jean-Félix Paulsen, Chateaudun, France, assignor to Societe Luxembourgeoise de Brevets et de Participations, Luxembourg, France
Filed Nov. 2, 1964, Ser. No. 408,172
Claims priority, application France, Nov. 7, 1963, 953,041
5 Claims. (Cl. 64—11)

The present invention relates to elastic couplings, and more particularly to rubber or plastic pads or bearings of the type which may, for example, be provided between two shafts capable of assuming a relative angle with respect to one another, this angle generally being rather small, so as to present alignment problems, particularly for high speed shafts.

It is a general object of this invention to simplify the construction of such bearings while at the same time rendering their operation homokinetic, i.e., such that, when the driving shaft rotates at a uniform speed, the driven shaft will also rotate at a uniform speed, even if the two shafts are angularly misaligned.

It is another object herein to permit a relatively large angle to exist between two coupled rotating shafts while automatically maintaining the coupling symmetrically disposed between said shafts.

This invention consists, principally, in combining the couplings of the type here involved, which are intended to join two plates arranged opposite one another and each mounted at the end of a respective one of said shafts, with an intermediate plate, or similar element, placed between the first named plates and connected to them by elastic bearing units disposed transversely to the peripheries of said plates, preferably in the form of elastic sockets mounted on fingers carried by the intermediate plate and having their external surfaces fixed in orifices arranged in the other two plates; the arrangement being notably such that the intermediate plate remains substantially in the plane bisecting the axes of the two shafts, so that homokinetic transmission is maintained. The word "homokinetic" is intended to mean that the instantaneous angular velocity of the driven shaft is constant when that of the driving shaft is constant.

This invention also involves several other arrangements which are preferably used at the same time as that described above and which will be described in detail below.

These and other objects, features and advantages of the present invention will become more readily apparent from the following detailed description when taken together with the attached drawings, in which:

FIG. 8 is a longitudinal cross-sectional view, each half of which shows a different variation of a coupling constructed according to still another embodiment of the invention;

FIG. 9 is a schematic view showing the condition of a driving finger carried by a coupling such as that shown in FIG. 1 or 8;

FIG. 10 shows a schematic view of such a finger arranged according to another modification of this invention;

Figure 1:
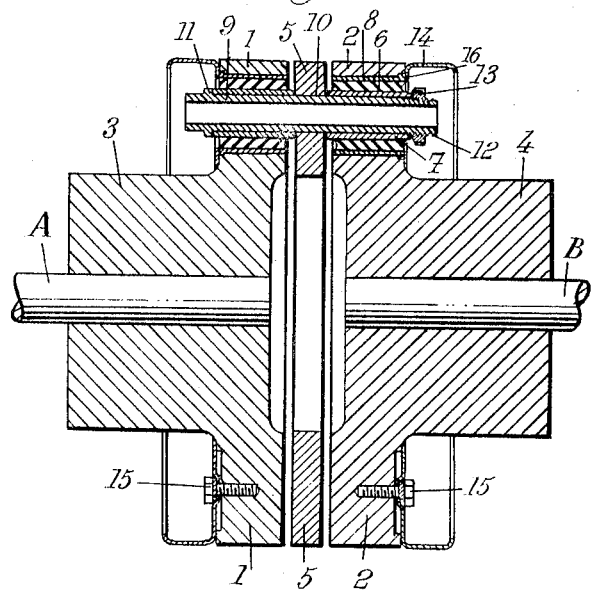
FIG. 1 shows a longitudinal, cross-sectional view, taken along the plane I—I of FIG. 2, of a coupling constructed according to the present invention.

In a general manner, all of the illustrated embodiments of the present invention have in common that they comprise, for example, two shafts A and B joined together by a coupling intended particularly to support any misalignment existing therebetween, especially, but not exclusively, for the case where the shafts are turning at high speed. The coupling is formed by two plates 1 and 2, each of which is mounted at the end of a respective one of shafts A and B and rigidly connected to a respective one of the hubs 3 and 4, and by an intermediate plate 5 connected to plates 1 and 2 by elastic bearing elements arranged around the peripheries of said plates.

In particular, these latter bearing elements could be constituted by elastic sockets 6 made preferably of rubber or another elastomer and each fastened between a pair of interior sleeves 7 and a pair of exterior sleeves 8. The inner sleeves 7 are rigidly joined to the intermediate plate 5, with the aid of a finger 9 or other suitable means, and the outer sleeves 8 are rigidly connected to plates 1 and 2.

Figure 2:
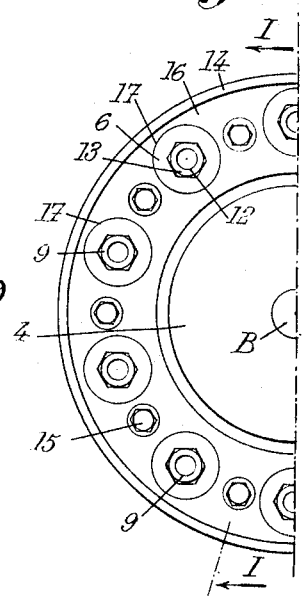
FIG. 2 is a partial end view of the structure of FIG. 1.

Referring now specifically to FIGS. 1 and 2, and to the upper half of FIG. 8 wherein is shown a more detailed view of the embodiment of these figures, the two aligned interior sleeves 7 are arranged on opposite sides of plate 5 and are rigidly connected thereto by means of a finger, such as the tubular element 9, held within said sleeves and passing through one of the holes 10 in plate 5. At one end, finger 9 carries an abutment shoulder 11, while, at the other end, it is formed with a screw thread 12 on which is screwed a nut 13.

The attachment of the exterior sleeve 8 to plates 1 and 2 is effected advantageously with the aid of metallic crowns 14, to which sleeves 8 are rigidly attached, these crowns being fastened, by screws 15 or other means, to plates 1 and 2 (FIG. 2). The base 16 of crowns 14 is provided with suitably placed holes 17 for permitting the play of sockets 6.

One variation of the above-described embodiment is shown in the lower half of FIG. 8. In this variation, the attachment of the two aligned sleeves 7 to plate 5 is effected by a shank $9_1$ one end of which carries a head 18 which bears against the outer end of one of the sleeves 7, and the other end of which is threaded to receive a nut 13 holding an abutting washer 19.

Figure 3:
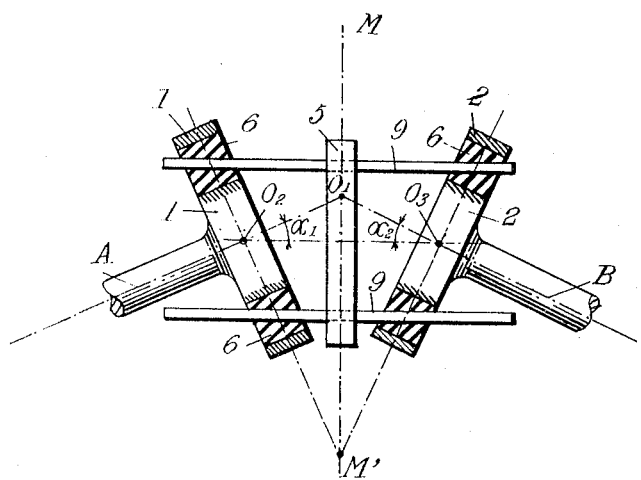
FIG. 3 is a pictorial cross-sectional view indicating the operation of the arrangement of FIGS. 1 and 2.

Whichever specific structure is used, the device functions in the manner illustrated in FIG. 3. In this figure the various angular displacements have been exaggerated for the sake of clarity.

It may be appreciated that if the characteristic dimensions for the elastic sockets are chosen so as to be identical for each pair of aligned sockets, the angles $\alpha_1$ and $\alpha_2$, between the axes of shafts A and B, respectively, and a line perpendicular to the median plane of plate 5, remain equal, and the shear and compression stresses remain identical for both sockets of each opposing, aligned pair, i.e. each pair attached to the same finger. The isosceles triangle 0, $0_2$, $0_3$, formed by the intersection of the axes of shafts A and B with a line joining the geometrical centers of plates 1 and 2, has an apex $0_1$ located in plate 5 and on the bisector M–M' of the angle between said two shaft axes. It is this condition which is both required and sufficient to maintain the coupling in a homokinetic condition.

It should also be noted that with such an arrangement the symmetry of the elastic sockets and their uniform spacing around the periphery of the plates, as well as their lightness, permit the achievement of high rotating speeds and facilitate the balancing of the coupling.

It might be desirable, in certain cases, to maintain plate 5 rigorously centered on the bisecting plane M–M′ with the aid of various types of joints such as the ball-and-socket arrangements shown in FIGS. 4–7.

Figure 4:
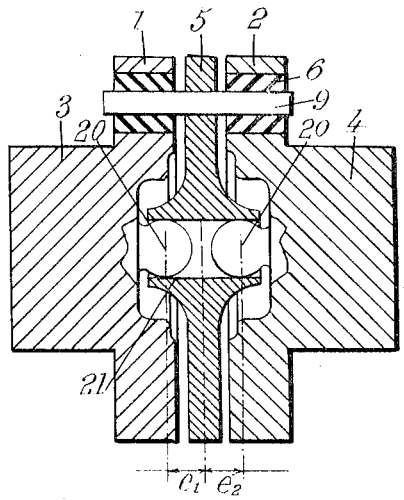
FIGS. 4 to 7 are longitudinal cross-sectional views showing various embodiments of the invention.

In the device illustrated in FIG. 4 each of the hubs 3 and 4 carries a ball 20 designed to pivot and slide in a bore 21 formed through the center of plate 5.

With this arrangement, bearing in mind what has been stated above, the distances $e_1$ and $e_2$, each of which represents the distance between the center of rotation of a respective ball 20 and the median plane of plate 5, may vary but will always remain equal to one another and the shaft axes always intersect at the point $O_1$ of FIG. 3, so that the homokinetic nature of the coupling is inevitably maintained.

Figure 5:
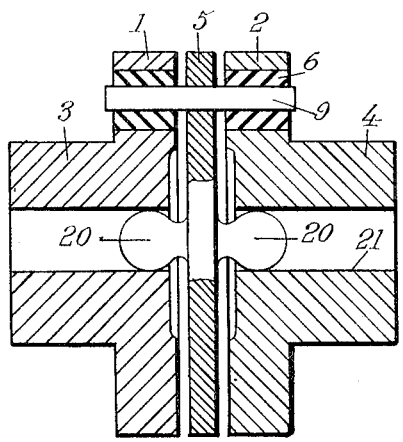

The device of FIG. 5 is obtained by a simple reversal of the basic elements of the FIG. 4 arrangement. That is, balls 20 are carried by intermediate plate 5 and slide in bores 21 arranged in hubs 3 and 4.

Figure 6:
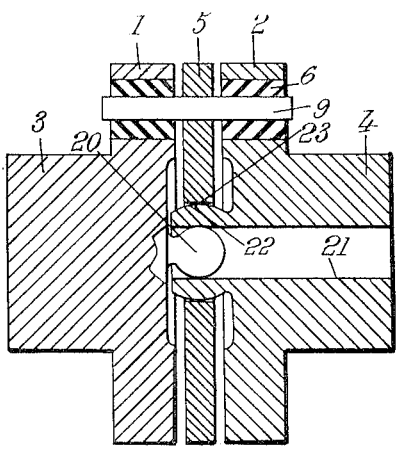

According to another variation, which is shown in FIG. 6, one ball 20 is carried by hub 3 and moves in the slider bore 21 of hub 4, while a second ball 22, which is concentric with ball 20 when the system is in its initial rest position, forms an extension of hub 4 and slides in a bore 23 formed through plate 5. The two balls need not remain concentric under all operating conditions; but their centers will automatically move equal distances away from the median plane of plate 5, thereby ensuring that the axes of shafts A and B always intersect on this plane and preserve the homokinetic state of the coupling.

Figure 7:
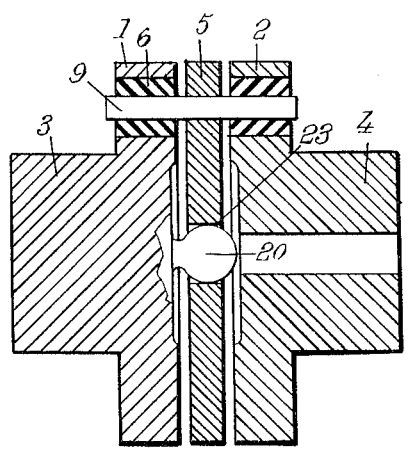

Still another variation of this concept is shown in FIG. 7 to consist of a single ball 20 rigidly connected to one hub and movable in a bore 23 arranged through the center of plate 5.

It should be noted that, independently of the rules of kinematics, the fact that plate 5 is mounted so as to always be centered on the bisector plane, particularly with the aid of the above described ball joints, permits the plate 5 to be prevented from moving off-center due to a residual unbalance existing in plate 5 or due to the effect of small differences in elastic characteristics from one socket (or other type of bearing) to another.

Generally, the angle between the two shaft axes will be relatively small, reaching a maximum of 5° or less in most practical applications. However, there is nothing to prevent the principles of the present invention from being used to construct a suitable coupling capable of supporting greater angular variations.

The present invention also covers the following embodiments which are particularly valuable where high speed rotations are involved.

In the embodiments described above, the driving fingers 9 (FIGS. 1, 8, 9), which are rigidly fastened to intermediate plate 5 and traverse the elastic sleeves which connect them to the outer plates 1 and 2, have their ends 25 free (FIG. 9).

It thus results that the action of centrifugal force, which can be quite high in certain cases, acts on each half-length L (FIG. 9) of finger 9 to produce an outward bending moment whose maximum effect exists adjacent the region where the finger is firmly gripped in plate 5.

This flexing moment, $M_f$, may be represented by the expression $M_f = PL/2$ where P is the centrifugal force acting on the finger.

This moment could give rise to large forces which would have to be offset by strengthening the various supporting pieces, by increasing their thickness for example.

In order to avoid such inconveniences, that is in order to assure the security of the coupling while retaining suitable dimensions for the various pieces, another feature of the present invention is employed according to which the extremities of fingers 9 are firmly held in rings, or any other means capable of joining together corresponding ends of all of the fingers.

This arrangement is shown schematically in FIG. 10, wherein it may be seen that respective ends 25 of each finger 9 are fixed in one of the annular rings 5a and 5b.

Under these conditions, the expression for the flexing moment becomes $M_f = PL/8$ since there are now created four sections, each experiencing one-half the centrifugal force and having one-half the moment arm of the two units of FIG. 9.

Figure 12:
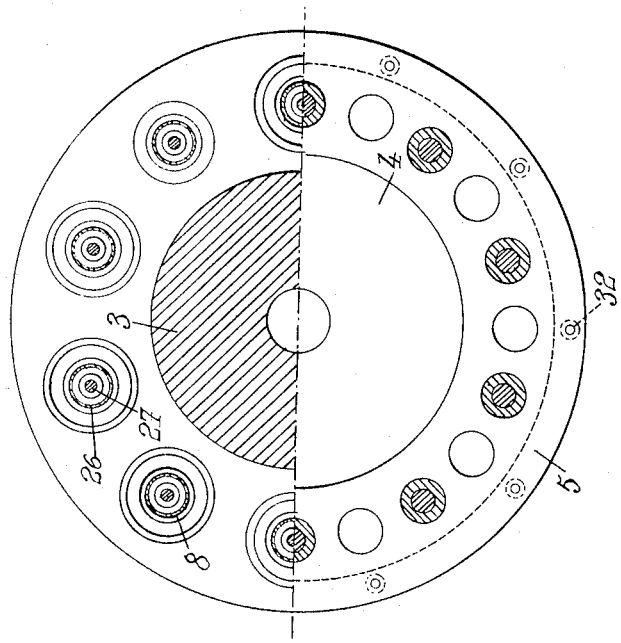
FIG. 12 is an axial cross-sectional view taken along the plane XII—XII of FIG. 11.
Figure 11:
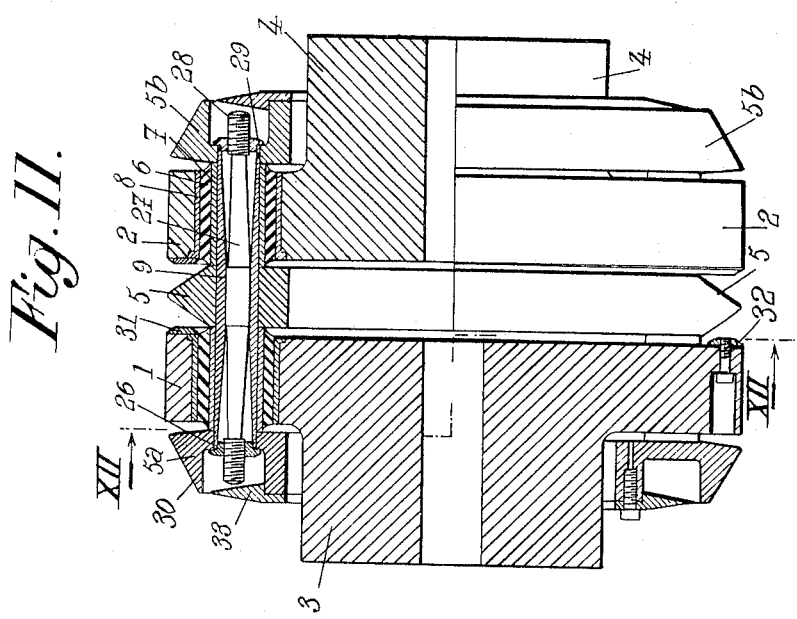
FIG. 11 is a longitudinal view, partly in cross-section, of another embodiment of this invention employing the arrangement shown in FIG. 10.

One practical device incorporating this feature is illustrated in FIGS. 11 and 12. The device shown therein contains a plurality of connectors each of which comprises a finger 9 which passes through plate 5 and interior sleeves 7 upon which are attached the elastic sockets 6.

At their ends, the fingers 9 pass through corresponding holes 26 provided in annular rings, or crowns, 5a and 5b, and they are maintained in position by any suitable means, for example by shanks 27 screw-threaded at their ends 28 and cooperating with nuts 29 housed in the grooves 30 arranged in rings 5a and 5b.

It should be obvious from the drawing that the assembly and disassembly of the device is particularly simple.

The units constituted by elastic sockets 6 and sleeves 7 and 8 are maintained in corresponding housings in plates 1 and 2 by, for example, a holding ring 31, held in place by easily accessible screws 32.

The fingers 9 are maintained in place by nuts 29.

The open sides of grooves 30 could normally be closed by protecting rings 33 which will prevent any injuries or damage which might be caused if one or more of the screws 29 were to break.

It should be understood that the device just described is constructed so that a sufficient play exists between crowns 5a and plate 1 and crown 5b and plate 2 to permit the shafts A and B to become angularly displaced with respect to one another.

Each of the above-described embodiments of the present invention has been found to possess the following advantages over the prior art:

The homokinetic character of the unit is assured.

The construction is simple, and hence the price is low.

They are light and can thus be used with high-speed shafts to eliminate any damage which otherwise might be caused if these shafts were to become misaligned.

In addition, the embodiment of FIGS. 11 and 12 presents the additional advantages of:

Offering a high resistance to centrifugal forces.

Permitting a reduction in the weight and strength of the elements connected between the shafts and the coupling; and Great ease of assembly and disassembly.

While several preferred embodiments of the present invention have been shown and described in detail herein, it should be appreciated that many variations and modifications could be made without departing from the spirit thereof and that its coverage should be limited only by the scope of the appended claims.

What I claim is:

1. A coupling for connecting together a pair of shafts comprising:
   a pair of hub members rigid with said shafts respectively, and comprising connecting plates facing each other, each of said plates being provided with a plurality of peripheral holes,
   an intermediate plate between said connecting plates carrying on its both sides a plurality of projections extending into the holes of both said connecting plates,
   means for elastically attaching said connecting plates to each of the projections of said intermediate plate, each of said means comprising an elastic tubular element and rigid inner and outer sleeves affixed to the inner and outer surfaces of said elastic tubular element, said inner sleeve engaging the corresponding projection and said outer sleeve fitting within the corresponding connecting plate hole, means for fixing the outer sleeves of said attaching means within said connecting plate holes, means for fixing the inner sleeves of said attaching means on said projections, and a pair of rings surrounding said hub members on either side of said intermediate plate, said rings having central bores whose diameters are sufficient to clear said hub members in positions of misalignment thereof, said rings engaging solely the ends of said projections for holding the same against the action of centrifugal forces.

2. An elastic coupling according to claim 1 wherein said means for fixing said outer sleeves of said attaching means within said connecting plate holes comprises an annular ring rigid with said outer sleeves and secured to said connecting plate coaxially thereto.

3. An elastic coupling according to claim 1 wherein the projections extending on either side of said intermediate plate consist of tubular members extending through holes in said intermediate plate corresponding to said holes in said connecting plates.

4. An elastic coupling for connecting together a pair of shafts comprising:

a pair of connecting plates facing each other and each rigid with the end of one of said shafts, respectively, and each of which is provided with a plurality of first openings located along its peripheral part, an intermediate plate having a plurality of second openings spaced along its peripheral part and in register with said first openings, hollow cylindrical projections symmetrically disposed about the median plane of said intermediate plate extending on opposite sides thereof and held each in a respective one of said second openings, two elastic bearing units for each of said projections, each unit comprising a tubular elastic member having an inner and an outer cylindrical surface and a rigid inner sleeve and a rigid outer sleeve both attached to said inner and outer cylindrical surfaces of said tubular elastic member, respectively, said two elastic bearing units being located on opposite sides, respectively, of said intermediate plate, said outer sleeves being arranged to be held each in fixed position in a corresponding opening of the associated connecting plate, and a retaining bolt extending through each of said projections, respectively, for holding the corresponding inner sleeves applied against sides of said intermediate plate.

5. An elastic coupling for connecting together a pair of shafts, comprising:

a pair of connecting plates each of which is rigidly mounted on the end of a respective one of said shafts, and each of which has a plurality of openings arranged around its periphery, an intermediate plate disposed between said connecting plates and having a plurality of openings arranged around its periphery, a plurality of elastic bearing means each having a central portion rigidly held in a respective one of said intermediate plate openings and outer portions elastically held in respective ones of said connecting plate openings, ball-and-socket joint means connected between said intermediate plate and said connecting plates, respectively, for maintaining said intermediate plate centered on the plane bisecting the angle formed by said shaft axes, said joint comprising two balls, one of which is slidably mounted in an axial bore in the other and carried by one of said connecting plates, the other ball being carried by the other of said connecting plates and slidably mounted in an axial bore in said intermediate plate.

References Cited by the Examiner

UNITED STATES PATENTS

| | | | |
|---|---|---|---|
| 1,434,690 | 11/1922 | Edwards | 64—10 |
| 1,821,215 | 9/1931 | Hahn | 64—10 |
| 2,565,606 | 8/1951 | Guy. | |
| 2,595,393 | 5/1952 | Langdon | 64—15 |
| 2,727,369 | 12/1955 | Fawick | 64—11 |
| 2,939,300 | 6/1960 | Lucia | 64—11 |
| 3,099,879 | 8/1963 | Horovitz | 64—11 X |

FOREIGN PATENTS

| | | |
|---|---|---|
| 419,054 | 10/1910 | France. |
| 564,963 | 10/1944 | Great Britain. |

FRED C. MATTERN, JR., *Primary Examiner.*

HALL C. COE, *Examiner.*